UNITED STATES PATENT OFFICE.

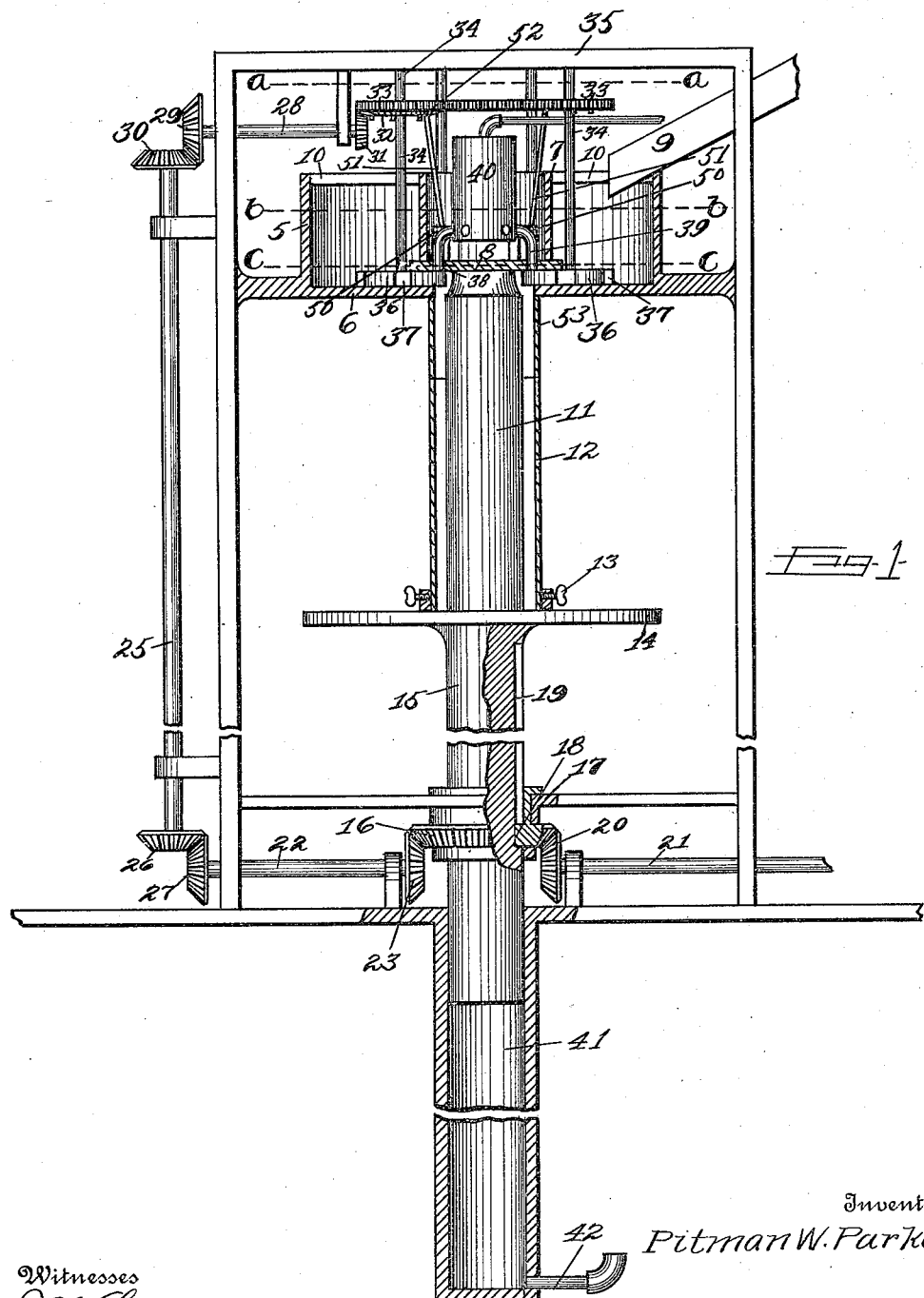

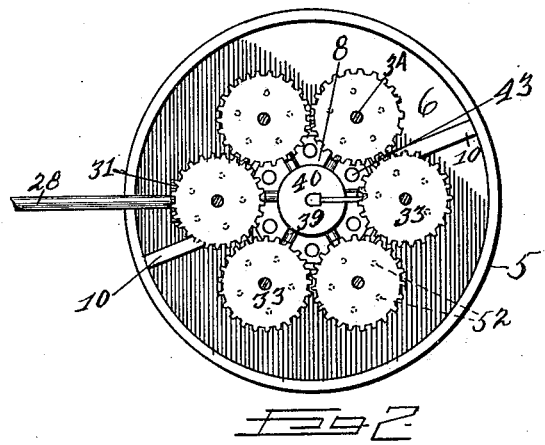
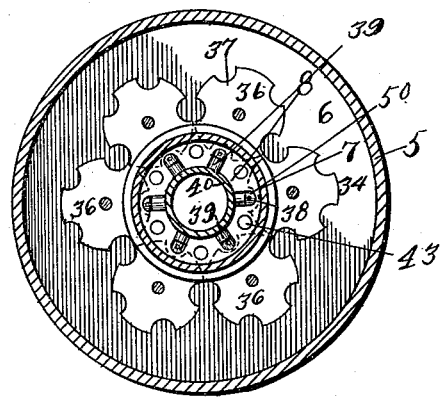
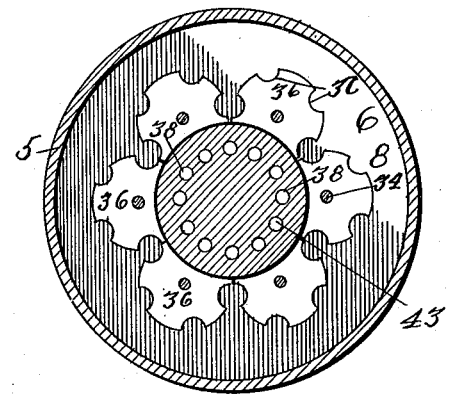

PITMAN W. PARKER, OF SAN DIEGO, CALIFORNIA.

MACHINE FOR MAKING TILE OR PIPE.

1,142,616.　　　　Specification of Letters Patent.　　Patented June 8, 1915.

Application filed July 19, 1912. Serial No. 710,344.

*To all whom it may concern:*

Be it known that I, PITMAN W. PARKER, a citizen of the United States of America, residing at San Diego, in the county of San Diego and State of California, have invented certain new and useful Improvements in Machines for Making Tile or Pipe, of which the following is a specification.

This invention relates to machines for making cement tile or pipe, the object of the invention being to provide a device of this character in which the cement and sand is automatically discharged under the impulse of compressed air jets into the form, or mold, with sufficient force to render unnecessary any other tamping.

It is the purpose of the present invention to provide a machine wherein the operations are carried out automatically. That is, the cement and sand, or other material of which the cement pipe is to be formed, is carried through a trough in a properly mixed condition, and is deposited in a hopper receiving chamber from which it is carried by carriers to a point over the upper end of the mold and from which point it is driven with considerable force into the mold by compressed jets of air. After the pipe has been formed, the mold descends to carry it clear of a core, after which the pipe and mold may be removed and another mold substituted. The molds are supported upon a vertically movable table to which rotation is preferably imparted during the molding operation, which rotation aids in imparting a desirable finish to the molded pipe.

Further objects and advantages of the invention will be set forth in the detailed description which now follows.

In the accompanying drawing Figure 1 is a view partly in elevation and partly in section of a machine illustrating one embodiment of the invention. Fig. 2 is a horizontal section upon line A—A of Fig. 1. Fig. 3 is a horizontal section upon line B—B of Fig. 1, and Fig. 4 is a horizontal section upon line C—C of Fig. 1.

Like numerals designate corresponding parts in all of the figures of the drawing.

A receptacle comprising side walls 5, bottom walls 6, inner annular walls 7 and plate 8 constitutes a hopper into which the material from which the cement pipe is to be made, is discharged through a spout or chute 9. Braces 10 support the wall 7 from the wall 5. From the underside of the plate 8 a core 11 depends. A mold 12 may be temporarily secured by thumb screws 13 upon a rotative and vertically movable table 14. The upper end of this mold bears against and lies in alinement with ring 53 which depends from plate 6. This table 14 is supported by a plunger 15 and rotation is imparted to the table by means of a gear wheel 16. This gear wheel is supported in a bearing 17 and has a key 18 entering a key-way 19 in the plunger 15 so that rotation of the gear 16 imparts rotation to the table 14, but vertical movement of the plunger with relation to the gear 16 is permitted. The gear 16 is driven by a bevel pinion 20 on a shaft 21, and from gear wheel 16 motion is imparted to a shaft 22 through the medium of a bevel pinion 23. Motion is imparted from shaft 22 to a vertical shaft 25 through the medium of bevel pinions 26 and 27. Motion of shaft 25 is in turn imparted to a horizontal shaft 28 through the medium of pinions 29 and 30. A bevel pinion 31 on the inner end of shaft 28, meshes with a bevel crown gear 32 to impart movement to a series of intermeshing spur gears 33. These spur gears are carried by vertical shafts 34, the upper ends of which are journaled in a frame member 35 and the lower ends of which are journaled in the bottom of the wall 6 of the hopper. Carrier wheels 36 are mounted upon the lower portions of the vertical shaft 34 and during their rotation pass through the hopper and gather into recesses 37 formed in their peripheries portions of the cement mixture. This cement mixture they carry around beneath the wall 8 until the recesses 37 come into alinement with openings 38 formed in plate 8. Pipes 39, from a compressed air tank 40, lead to the opening 38 so that as the recesses 37 come into alinement with openings 38, a jet of compressed air forces the material from the recesses 37 and into the space between mold 12 and core 11.

It is to be understood that the jet of compressed air may be valve controlled if desired, and for the purpose of illustrating a structure adapted to do this, I have indicated in Fig. 1, valves adapted to be actuated when stems 51 thereof contact with pins 52 carried by the gear wheels 33, the casing of said valves being indicated at 50, it being understood that the stems 51 have swinging movement to let the pins pass, which swinging movement opens the valve. Many other arrangements may be provided for causing the valves to open at the proper moment, such structures being common in many machines and in many arts. Means for elevating the table 14 may comprise, if desired, a hydraulic cylinder 41 in which plunger 15 travels so that when water is admitted to said cylinder through pipe 42, the plunger will be forced upwardly to elevate the mold. If desired, vent openings 43 may be provided in plate 8 to permit the escape of the air discharged into the interior of the mold.

The present invention comprises simple and efficient means for automatically making cement tile or pipe. It is to be understood that the connections for driving the various elements, may be modified or carried out in many different ways, the invention residing more broadly in the method of forcing the mixture into the mold by a compressed air jet than in providing the specific mechanical structure herein shown and described. However, this mechanical structure also forms a part of the invention, as it presents a very simple and efficient means for manufacturing cement pipe in the manner indicated.

While the elements shown and described are well adapted to serve the purposes for which they are intended, it is to be understood that the invention is not limited to the precise construction set forth, but includes within its purview such changes as may be made within the scope of the appended claims.

Having described my invention, what I claim is:—

1. In a device of the character described, the combination with a vertically reciprocatory and rotative plunger, of a table carried by said plunger, a cylindrical mold body having an open upper end, means for securing said mold body upon said table in a vertical position, a cement receptacle disposed above said table and having an opening formed in its bottom in alinement with said mold body, a fixed core depending centrally from the under side of said receptacle and extending downwardly through said opening into said mold and lying in spaced relation to the sides of said mold and means carried by the receptacle for supporting said core.

2. In a device of the character described, the combination with a vertically reciprocatory and rotative plunger, of a table carried by said plunger, a cylindrical mold body having an open upper end, means for securing said mold body upon said table in a vertical position, a cement receptacle disposed above said table and having an opening formed in its bottom in alinement with said mold body, a fixed core extending through said opening into said mold and lying in spaced relation to the sides of said mold, means for feeding cement through said opening from said receptacle and around said core, means carried by the receptacle for supporting said core and a fixed cylindrical member depending from the under side of said receptacle and arranged to aline with the mold body when said mold body is elevated.

3. In a device of the character described, the combination with a vertically reciprocatory and rotative plunger, of a table carried by said plunger, a cylindrical mold body open at the top and bottom, means carried by the table for clamping said mold body thereon in a vertical position, a cement receptacle disposed directly above said table and comprising a bottom wall having an opening formed centrally therein in alinement with said mold body, said receptacle having a horizontal wall spaced from the bottom wall and overlying said opening, a fixed core of smaller diameter than said opening depending from said horizontal wall in concentric relation to said mold body, means for feeding cement through said opening from said receptacle and around said core, and a fixed cylindrical member depending from the bottom wall of the receptacle in alinement with and of a diameter equal to said cylindrical mold body.

4. In a device of the character described, the combination with a cement receptacle comprising a bottom wall having an opening formed centrally therein, a horizontal wall overlying said opening in spaced relation to the bottom wall of the receptacle, a fixed core of smaller diameter than said opening depending from said horizontal wall through said opening and means for feeding cement from said receptacle through said opening and around said core.

5. In a device of the character described, the combination with a cement receptacle comprising a bottom wall having an opening formed centrally therein, a horizontal wall overlying said opening in spaced relation to the bottom wall of the receptacle, a fixed core of smaller diameter than said opening depending from said horizontal wall through said opening, means for feeding cement from said receptacle through said opening and around said core, a vertically movable mold supporting element disposed beneath said receptacle and in alinement with said core.

In testimony whereof I affix my signature in presence of two witnesses.

PITMAN W. PARKER.

Witnesses:
J. C. HIZAR,
G. U. FRY.